US009536546B2

(12) United States Patent
Motta et al.

(10) Patent No.: US 9,536,546 B2
(45) Date of Patent: Jan. 3, 2017

(54) FINDING DIFFERENCES IN NEARLY-IDENTICAL AUDIO RECORDINGS

(71) Applicant: Google Inc., Mountain View, CA (US)

(72) Inventors: Giovanni Motta, San Jose, CA (US); Yang Lu, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 198 days.

(21) Appl. No.: 14/453,762

(22) Filed: Aug. 7, 2014

(65) Prior Publication Data

US 2016/0042761 A1  Feb. 11, 2016

(51) Int. Cl.
G06F 17/00 (2006.01)
G10L 25/51 (2013.01)
G06F 17/30 (2006.01)

(52) U.S. Cl.
CPC ......... *G10L 25/51* (2013.01); *G06F 17/30026* (2013.01); *G06F 17/30743* (2013.01); *G10H 2210/031* (2013.01)

(58) Field of Classification Search
CPC ... G10H 2210/031; G10L 25/51; G10L 25/54; G10L 25/48; G06F 17/30026; G06F 17/30743
See application file for complete search history.

(56) References Cited

U.S. PATENT DOCUMENTS 7,831,605 B2 * 11/2010 Plastina ................ G09B 5/06
                                                707/758
8,458,482 B2  6/2013 Conwell
8,467,892 B2  6/2013 Steinberg
2014/0280304 A1 * 9/2014 Scherf ............. G06F 17/30743
                                                707/769

FOREIGN PATENT DOCUMENTS

EP    1113432 B1    3/2011

* cited by examiner

Primary Examiner — Fan Tsang
Assistant Examiner — David Siegel
(74) Attorney, Agent, or Firm — Morris & Kamlay LLP

(57) ABSTRACT

Systems and techniques are provided for finding differences in nearly-identical audio recordings. A first version of an audio recording may be received. A second version of the audio recording may be received. A difference between the first version of the audio recording and the second version of the audio recording may be determined using time domain analysis and frequency domain analysis. The difference may be stored in a difference set. The difference set may allow the first version of the audio recording to be distinguished from the second version of the audio recording. The audio recording may be a music track. The first version of the audio recording may be an explicit version of the music track. The second version of the audio recording may be an edited version of the music track.

23 Claims, 6 Drawing Sheets

FINDING DIFFERENCES IN NEARLY-IDENTICAL AUDIO RECORDINGS

BACKGROUND

Online storage services on the Internet, such as storage on a cloud server, may allow users to upload music tracks that they own. This may allow the user to access their music tracks from any computing device that can access the online storage service. To save storage space, the online storage service may not actually store a new file for every track uploaded by a user. The online storage service may have an associated music library, which may contain a number of music tracks. When a user attempts to upload a music track for which there is already a copy or version in the music library, the online storage service may, instead of creating a new file on its servers, create a link in the user's music library to the music track in the online storage service's music library. When the user plays back the music track from the online storage service, the music track may be streamed from the online storage service's music library. This may save storage space for the online storage service, as only one copy of a particular track may be needed even when multiple users have the music track in their music library on the online storage service.

In order to determine whether a music track uploaded by a user can be redirected to a music track in the online storage service's music library, the music track must be matched. Various audio-fingerprinting techniques, combined with metadata for the user's track, may be used to determine which track the user is attempting to upload. Sometimes, there may be different versions of a music track. For example, a music track may come in explicit and edited versions. Audio-fingerprinting may be unable to distinguish which version of the music track the user is attempting to upload, and may match the music track to the wrong version on the online storage service's music library. The user may then hear the incorrect version of the music track, for example, the edited version instead of the explicit version, when they play back the music track using the online storage service.

BRIEF SUMMARY

According to an embodiment of the disclosed subject matter, a first version of an audio recording may be received. A second version of the audio recording may be received. A difference between the first version of the audio recording and the second version of the audio recording may be determined using time domain analysis and frequency domain analysis. The difference may be stored in a difference set. The difference set may allow the first version of the audio recording to be distinguished from the second version of the audio recording.

The difference between the first version of the audio recording and the second version of the audio recording may be determined using time domain analysis. The first version of the audio recording and the second version of the audio recording may be partitioned into non-overlapping blocks of fixed lengths. The blocks for the second version of the audio recording may be aligned with corresponding blocks for the first version of the audio recording to form block pairs. The block for the second version of the audio recording may be subtracted from the corresponding block for the first version of the audio recording for each block pair to obtain a residual signal. A weighted spectrum of the second version of the audio recording may be subtracted from the residual signal to obtain a difference signal. The difference signal may be squared to obtain a squared difference signal. A mean value for the difference signal may be determined to obtain a threshold. Each peak in the squared difference signal that is greater than the threshold may be inspected to determine if each peak represents a difference.

The difference between the first version of the audio recording and the second version of the audio recording may be determined using frequency domain analysis. An audio fingerprint may be generated for the first version of the audio recording and an audio fingerprint may be generated for the second version of the audio recording. The audio fingerprint for the second version of the audio recording may be partitioned into overlapping blocks of fixed length. The blocks for the audio fingerprint for the second version of the audio recording may be aligned with the audio fingerprint for the first version of the audio recording to obtain the best match score between the blocks and the audio fingerprint for the first version of the audio recording. Valleys may be detected in a curve including match scores for each of the block. Each valley may correspond to a difference.

The difference may be an edit. A copy of the audio recording may be received. The copy may be either a copy of the first version of the audio recording or a copy of the second version of the audio recording. The copy the audio recording may be compared to the difference from the difference set. The copy of the audio recording may be determined to not include the difference from the difference set. The copy of the audio recording may be identified as a copy of the first version of the audio recording.

A copy of the audio recording may be received. The copy may be either a copy of the first version of the audio recording or a copy of the second version of the audio recording. The copy the audio recording may be compared to the difference from the difference set. The copy of the audio recording may be determined to include the difference from the difference set. The copy of the audio recording may be identified as a copy of the second version of the audio recording.

A link to the first version of the audio recording may be placed in a user library. The first version of the audio recording may be stored in an online music library distinct from the user library. A link to the second version of the audio recording may be placed in a user library. The second version of the audio recording may be stored in an online music library distinct from the user library.

The audio recording may be a music track. The first version of the audio recording may be an explicit version of the music track and the second version of the audio recording may be an edited version of the music track. The first version of the audio recording and the second version of the audio recording may be determined to be 180 degrees out of phase. The sign of the second version of the audio recording may be inverted before partitioning the second version of the audio recording. The first version of the audio recording and the second version of the audio recording may be stored in an online music library. The copy of the audio recording may be received from a computing device of a user with an account in an online storage service. A heuristic may be applied to the difference to determine if the difference is an edit. All of the differences may be discarded based on applying a heuristic that determines that there are an excessive number of differences.

According to an embodiment of the disclosed subject matter, a means for receiving a first version of an audio recording, a means for receiving a second version of the audio recording, a means for determining a difference between the first version of the audio recording and the second version of the audio recording using one or more of time domain analysis and frequency domain analysis, a means for storing the at least one difference in a difference set, wherein the difference set allows the first version of the audio recording to be distinguished from the second version of the audio recording, a means for partitioning the first version of the audio recording and the second version of the audio recording into non-overlapping blocks of fixed lengths, a means for aligning the blocks for the second version of the audio recording with corresponding blocks for the first version of the audio recording to form block pairs, a means for subtracting the block for the second version of the audio recording from the corresponding block for the first version of the audio recording for each block pair to obtain a residual signal, a means for subtracting a weighted spectrum of the second version of the audio recording from the residual signal to obtain a difference signal, a means for squaring the difference signal to obtain a squared difference signal, a means for determining a mean value for the difference signal to obtain a threshold, a means for inspecting each peak in the squared difference signal that is greater than the threshold to determine if each peak represents a difference, a means for generating an audio fingerprint for the first version of the audio recording and an audio fingerprint for the second version of the audio recording, a means for partitioning the audio fingerprint for the second version of the audio recording into overlapping blocks of fixed length, a means for aligning the blocks for the audio fingerprint for the second version of the audio recording with the audio fingerprint for the first version of the audio recording to obtain the best match score between the blocks and the audio fingerprint for the first version of the audio recording, a means for detecting valleys in a curve comprising match scores for each of the blocks, wherein each valley corresponds to a difference, a means for receiving a copy of the audio recording, wherein the copy is either a copy of the first version of the audio recording or a copy of the second version of the audio recording, a means for comparing the copy the audio recording to the difference from the difference set, a means for determining that the copy of the audio recording does not include the difference from the difference set, a means for identifying the copy of the audio recording as a copy of the first version of the audio recording, a means for receiving a copy of the audio recording, wherein the copy is either a copy of the first version of the audio recording or a copy of the second version of the audio recording, a means for comparing the copy the audio recording to the at least one difference from the difference set, a means for determining that the copy of the audio recording includes the difference from the difference set, a means for identifying the copy of the audio recording as a copy of the second version of the audio recording, a means for placing a link to the first version of the audio recording in a user library, wherein the first version of the audio recording is stored in an online music library distinct from the user library, a means for placing a link to the second version of the audio recording in a user library, wherein the second version of the audio recording is stored in an online music library distinct from the user library, a means for determining that the first version of the audio recording and the second version of the audio recording are 180 degrees out of phase, a means for inverting the sign of the second version of the audio recording before partitioning the second version of the audio recording, a means for applying a heuristic to the at difference to determine if the difference is an edit, and a means for discarding all of the differences based on applying a heuristic that determines that there are an excessive number of differences, are included.

Systems and techniques disclosed herein may allow for finding differences in nearly-identical audio recordings. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
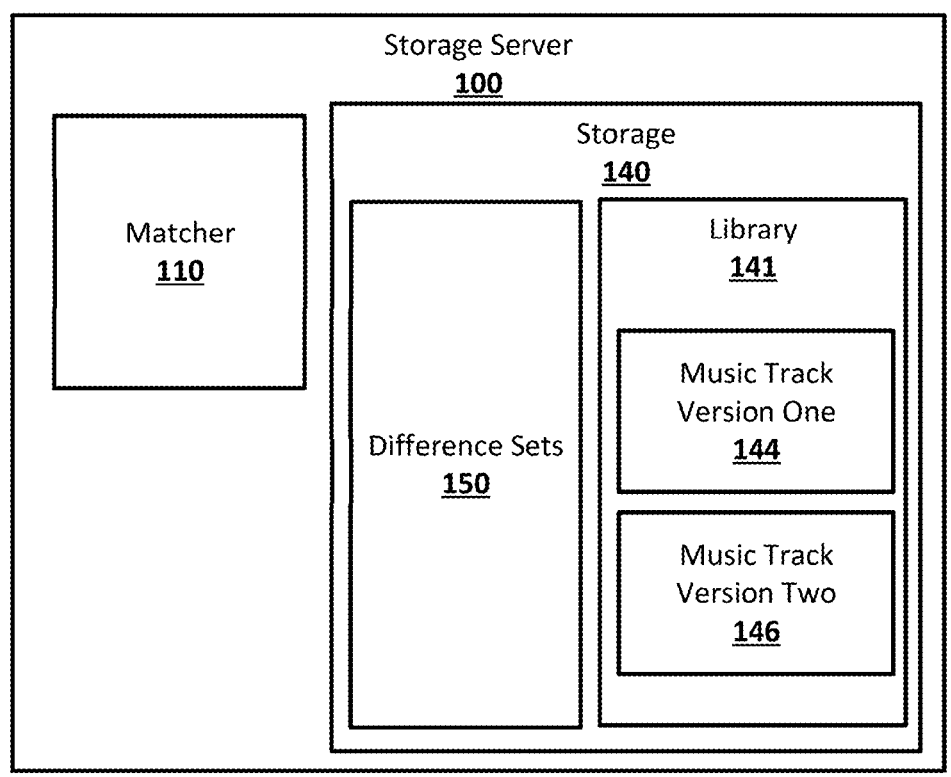
FIG. 1 shows an example system suitable for finding differences in nearly-identical audio recordings according to an implementation of the disclosed subject matter.

Finding differences in nearly-identical audio recording may allow for differentiation between different versions of the same music track. An audio-recording, such as a music track, may exist in a number of different versions. For example, a music track may be released in both an explicit and an edited versions, where the edited versions removes certain material from the explicit version via bleeping, vocal track replacement, or editing to remove certain sections of the explicit version. Time domain and frequency domain analysis may be used to generate a difference set for the differences between different versions of an audio recording, such as a music track. The resultant difference set may identify edits between a first version of the audio recording and a second version of the audio recording, including the time points at which the edits are located in the second version of the audio recording, and the duration and strength of the edits. The difference identification may be performed by, for example, a server associated with an online storage service and online music library. The server may compares different versions of audio recordings, such as music tracks, in the online music library to generate difference sets that allow for differentiation between the different versions. When a user of the online storage service attempts to upload a music track from their local personal music library, the server may determine that different versions of the music track are already stored in the online music library. The server may use the difference set to determine which version of the music track the user is attempting to upload to the server. A link to the appropriate version of the music track in the online music library may be stored in an online personal music library for the user. This may save storage space on the server, as the online storage service only needs to store one copy of the music track for some number of users, based on how many users can stream that copy at once, instead of storing a new copy of the music track for each user who uploads the music track to their online personal music library. Each user will still be able to play back the correct version of the music track from their personal online music library, so that a user who attempted to upload the edited version of the music track does not end up playing back the explicit version of the music track.

Many different versions may exist of the same audio recording. For example, music tracks may exist in edited, explicit, extended, and live versions. The different versions of the same audio recording may be substantially similar, but may include a number of differences based on the version of the audio recording. For example, an explicit version of a music track may include profanity at various points, while an edited version of the music track may include vocal silence in place of the profanity. An extended version of a music track may have a longer run-time than a non-extended version, and a live version may vary in run-time and include different musical content at various points.

An online storage service, for example, a cloud-based storage service for music libraries, may store audio recording uploaded by a number of users. For example, an online storage service may allow users to upload music tracks from their own, locally stored, personal music library to the online storage service, where the music tracks are stored in an online personal music library. A user may be able to access their online personal music library from any suitable computing device, for example, including smartphones, tablets, laptops, desktops, smart televisions, and streaming media devices. The online storage service may also be associated with its own library of audio recordings, for example, an online music library. For example, the server or servers may include an online music library, which may include music tracks which have been purchased or licensed for distribution by the party operating the online storage service. The online storage service's library of audio recordings may include different versions of the same audio recording. For example, an online music library may include both an edited and explicit version of the same music track.

The different versions of an audio recording in a library of audio recordings may be used to determine differences between the different versions, generating a difference set. For example, the server for an online storage service may compare the explicit and edited versions of a music track in order to determine the differences between the explicit and edited versions and generate a difference set that may be used to identify whether a future copy of the music track is the explicit or edited version. To generate the difference set, time-domain analysis may be performed on the first version of the audio recording and the second version of the audio recording. The first version and second version of the audio recording may be compared to determine whether they have a relative phase of 0 or 180 degrees. If the relative phase is determined to be 180 degrees, the sign of either the first audio recording or the second audio recording may be inverted. The volume of either the first and second version of the audio recording may also be normalized to match the volume of the other version of the audio recording. The first version and second version of the audio recording may then both be partitioned into non-overlapping bocks of fixed length. The blocks for the first version of the audio recording and the blocks for the second version of the audio recording may be aligned, with the alignment being between corresponding blocks, or block pairs. For example, the first block from the first version of the audio recording may be aligned with the first block from the second version of the audio recording. One of the blocks in a block pair may be interpolated, for example, at 1/2, 1/3, and 2/3 sample positions, and various alignments may be attempted between the blocks in the block pair, with the final alignment being the alignment that yields the smallest error.

After alignment, the blocks in each block pair may be subtracted from one another. For example, the first block from the second version of the audio recording may be subtracted from the first block of the first version of the audio recording based on the alignment between them. The subtraction may result in a residual signal. The residual signal may still include signal information that was present in both blocks when the alignment between the blocks in the block pair is not perfect, for example, due to different encodings used for the first and second versions of the audio recording, as otherwise that signal information would have been removed during subtraction. Spectral subtraction may be used on the residual signal to further remove signal information that is present in both blocks in block pair. A weighted spectrum of the block from the second version of the audio recording may be subtracted from the residual signal. For example, the weighted spectrum of the first block of the second version of the audio recording may be subtracted from the residual signal obtained by subtracting the first block of the second version of the audio recording from the first block of the first version of the audio recording. Spectral subtraction from the residual signal may result in a difference signal for the block pair.

The difference signal for each block pair may be squared, and a threshold may be determined based on the mean value of the squared difference signal. Any peaks in the squared difference signal that are above the threshold may be inspected to determine whether the samples surrounding the peak correspond to a difference between the first version of the audio recording and the second version of the audio recording, such as, for example, an edit made to turn an explicit version of a music track into an edited version of the music track. Heuristics may be applied to any determined differences, based, for example, on length and energy of the difference, or edit, to discard any minor differences or glitches. If an excessive number of differences are found between the first version of the audio recording and the second version of the audio recording, all the differences may be rejected, as the second version of the audio recording may not actually be related to the first version of the audio recording. The differences that are found may be stored in a difference set, which may include the time location at which the differences, or edits, are located within the first and second version of the audio recording. The difference set may be stored, for example, on a server for the online storage service.

Frequency-domain analysis may also be performed on the first version of the audio recording and the second version of the audio recording. Audio fingerprints may be generated for the first version of the audio recording and the second version of the audio recording. The audio fingerprint for the second version of the audio recording may be partitioned into overlapping blocks of fixed length. The blocks from the audio fingerprint of the second version of the audio recording may be aligned with the audio fingerprint first version of the audio recording. The blocks may be aligned so that the alignment between the block from the audio fingerprint of the second version of the audio recording and the audio fingerprint of the first version of the audio recording has the best match score. Each aligned block may have a match score, which may be higher to indicate a better match between the audio fingerprint blocks. The match scores may form a match scores curve. The match scores curve may be examined for "valleys", which may indicate blocks whose best match score was below average. The "valleys" may indicate blocks where the audio fingerprint of the second version of the audio recording differed substantially form the audio fingerprint of the first version of the audio recording, indicating the presence of an edit. For example, a valley may appear when the audio fingerprint block was made from a segment of an explicit music track that includes profanity was aligned with a corresponding section of the audio fingerprint from the edited version of the music track, as the edit to remove the profanity may result in the audio fingerprints being different, and therefore the block having a low match score. Edits located using frequency domain analysis for the first version and second version of the audio recording may be stored in the difference set with the edits located using the time domain analysis. The difference set may include all of the edits identified between the first and second versions of the audio recording.

A user may attempt to upload an audio recording, for example, to the online storage service. The online storage service may use metadata for the audio recording, for example, the artist, album, and title for a music track embedded in the file with the music track, or conventional audio fingerprinting to identify the audio recording. The online storage service may determine that multiple versions of the audio recording exist. For example, the user may attempt to upload a music track for which there is both an explicit and edited version. The online storage service may use a difference set generated from the different versions of the audio recording in order to identify which version of the audio recording the user is attempting to upload. For example, the online storage service may check time locations in the audio recording being uploaded based on the time locations for edits in the difference set to determine if those edits also exist in the version being uploaded. For example, the difference set may indicate an edit at the 30 second mark of the edited version of a music track when compared to the explicit version of the music track. If the audio recording being uploaded matches the difference set for the edit, for example, the 30 second mark of the music track matches the edit in the difference set that was located at the 30 second mark, the audio recording may be matched to the version specified by the difference set. For example, the music track may be matched to the edited version of the music track. The online storage service may place a link to the matched version of the audio recording in the online personal music library for the user. For example, a link to the edited version of the music track may be placed in the online personal music library. The link may be used instead of the audio recording the user was attempting to upload. When the user attempts to access the audio recording from their online personal music library, they may be presented with the linked version from the online music library of the online storage service. This may save space on the server for the online storage service, as the user's audio recording is not actually uploaded and stored in the online personal music library. The online storage service may also be able to receive an indication from the user if a link to the wrong version has been placed in the online personal music library. For example, the online storage service may place a link to an edited version of a music track in the online personal music library. The user may, upon listening to the edited version of the music track, determine that the online storage service made a mistake, as the user was attempting to upload the explicit version.

The difference set may also be used to replace audio recordings already stored in an online personal music library with links to appropriate audio recording versions from the online music library. For example, a user may have already uploaded a number of music tracks, which may be stored on the server for the online storage service in the user's online personal music library. The online storage service may examine the audio recordings and determine that the audio recordings correspond to audio recordings for which the online music library has multiple versions. The online storage service may use difference sets to determine which version of the audio recording is in the online personal music library, and may replace the audio recording with a link to the appropriate version of the audio recording from online music library. This may save storage space, as the online storage service may no longer need to store the copy of the audio recording that was uploaded by the user. The online storage service may keep the uploaded copy of the audio recording for a period of time, and remove the copy if the user does not indicate that a mistake was made in identifying the version of the audio recording now linked in the online personal music library during that period of time.

FIG. 1 shows an example system suitable for finding differences in nearly-identical audio recordings according to an implementation of the disclosed subject matter. A storage server 100 may include a matcher 110 and a storage 140. The storage server 100 may be any suitable device, such as, for example, a computer 20 as described in FIG. 8, for implementing the matcher 110 and the storage 140. The storage server 100 may be a single computing device, or may include multiple connected computing devices, and may be, for example, an individual server, a server farm, or distributed server system. The matcher 110 may be any suitable application that may run on the storage server 100 and may perform time domain and frequency domain analysis of the music track version one 144 and the music track version two 146 to determine a difference set for difference sets 150. The storage 140 may store a library 141, including the music track version one 144 and the music track version two 146, and the difference sets 150 in any suitable manner.

The storage server 100 may be any suitable combination of hardware and software for implementing a server system. For example, the storage server 100 may be the server for an online storage service. The storage server 100 may include the storage 140, which may be any suitable storage, such as, for example any combination of magnetic hard drives, solid state drives, and other forms of storage. The storage 140 may include the library 141, which may be, for example, a library of stored audio recordings such as an online music library for the online storage service. The library 141 may include stored audio recordings, and may include different versions of an audio recording. For example, the library 141 may include two versions of the same music track, the music track version one 144 and the music track version two 146. The library 141 may make audio recordings accessible to users of the online storage service, who may be able to stream the audio recordings from the library 141 to the user's personal computing devices.

The matcher 110 may by any suitable combination of hardware and software on the storage server 100 for determining difference sets, such as the difference sets 150, based on differences between versions of an audio recording, such as the music track version one 144 and the music track version two 146. For example, the music track version 144 and the music track version two 146 may be the explicit and edited versions of the same music track. The matcher 110 may generate a difference set based on detecting the edits that were made to the explicit version, for example, the music track version one 144, to create the explicit version, for example, the music track version two 146. The matcher 110 may use time domain analysis and frequency domain analysis to generate the difference set. The matcher 110 may also be able to use the difference set to identify the version of an audio recording. For example, the matcher 110 may be able to receive another copy of the music track version two 146 and identify that it is a copy of the music track version two 146, and not of the music track version one 144, based on the difference set that includes the determined edits.

The difference sets 150 may include difference sets generated by the matcher 110. For example, the matcher 110 may perform time domain and frequency domain analysis on the music track version one 144 and the music track version two 146. The analysis may result in a difference set, which may include the time location, duration, and strength of differences, such as edits, between the music track version one 144 and the music track version two 146. The difference set may be used by the matcher 110 to distinguish copies of the music track version one 144 from copies of the music track version two 146. The matcher 110 may generate difference sets for all of the versions of an audio recording, so that, for example, an audio recording with four different versions may have three or more difference sets to allow differentiation between the four different versions.

Figure 2:
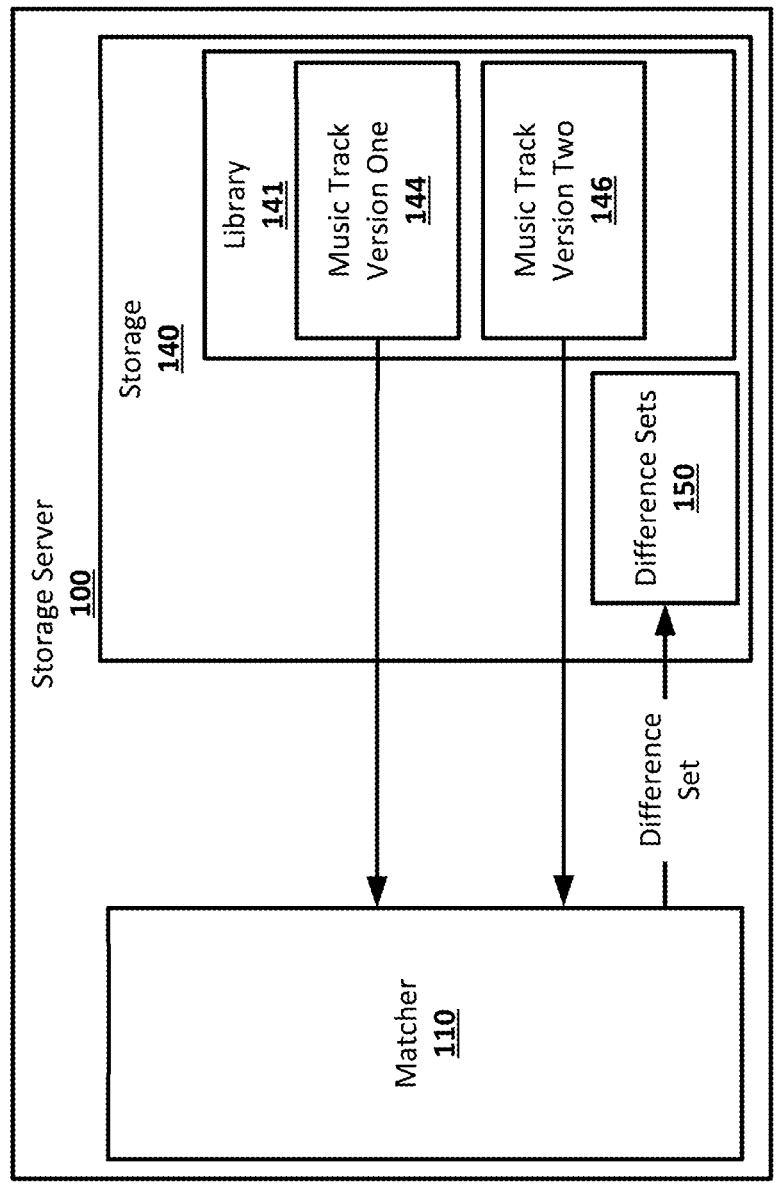
FIG. 2 shows an example arrangement for finding differences in nearly-identical audio recordings according to an implementation of the disclosed subject matter.

FIG. 2 shows an example arrangement for finding differences in nearly-identical audio recordings according to an implementation of the disclosed subject matter. The matcher 110 may receive the music track version one 144 and the music track version two 146 from the library 141. For example, the matcher 110 may be set up to constantly check the library 141 for any audio recordings with multiple versions and to generate difference sets for versions of any audio recordings that have not already had difference sets generated. This may ensure that difference sets exist for all audio recordings that have multiple versions in the library 141. The matcher 110 may generate a difference set from the music track version one 144 and the music track version two 146, for example, by performing time domain and frequency domain analysis. The difference set may identify the time location, duration, strength, and audio fingerprint for any difference, or edits, detected between the music track version one 144 and the music track version two 146. The difference set may be stored in the storage 140 with the difference sets 150.

Figure 3:
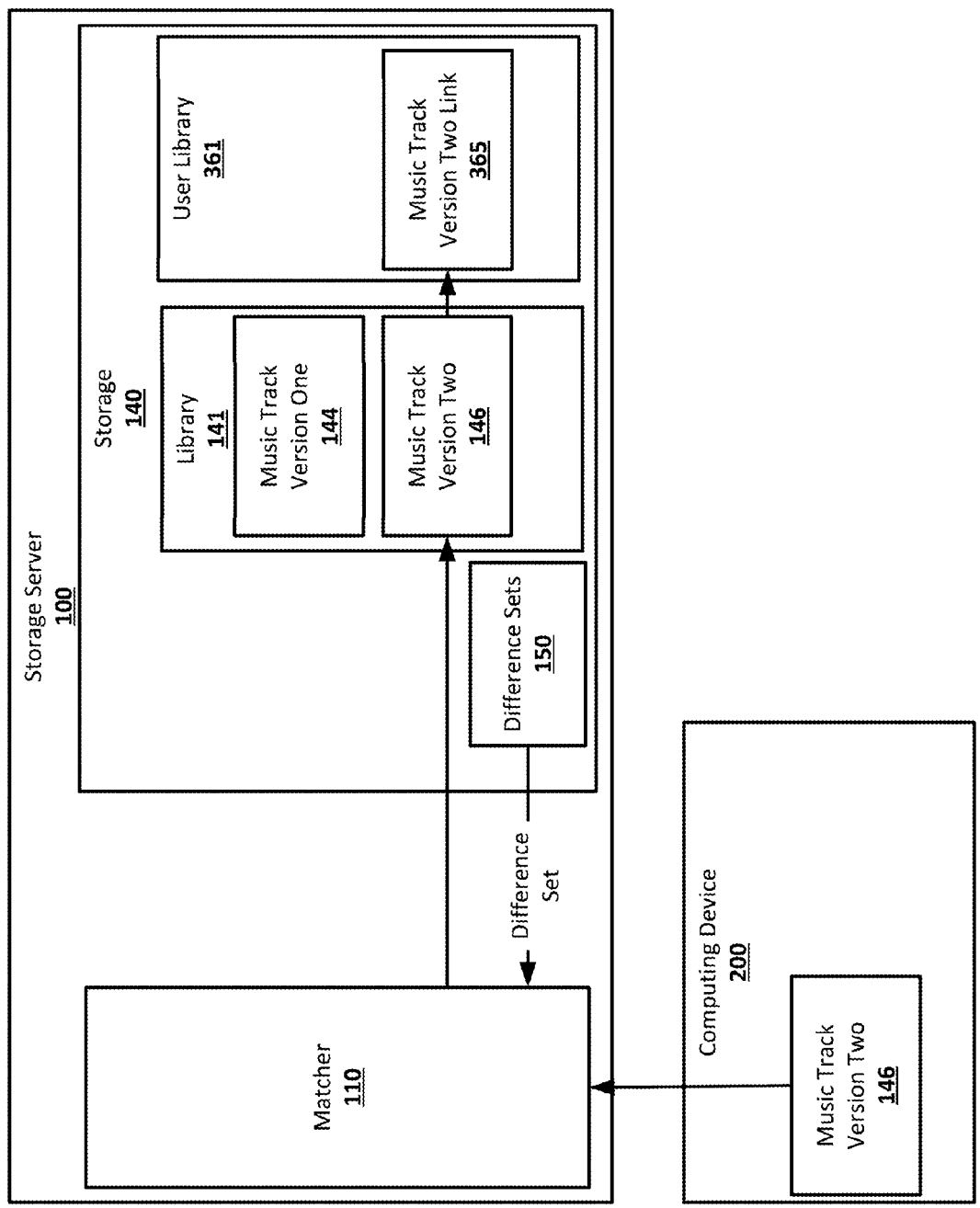
FIG. 3 shows an example of arrangement for finding differences in nearly-identical audio recordings according to an implementation of the disclosed subject matter.

FIG. 3 shows an example of arrangement for finding differences in nearly-identical audio recordings according to an implementation of the disclosed subject matter. A user, using, for example, a computing device 200, may attempt to upload an audio recording, such as a copy of the music track version two 146 to the storage server 100. The computing device 200 may be any suitable computing device, such as, for example, a tablet, smartphone, laptop, or desktop computer. The user may have a user library 361 on the storage server 100. The user library 361 may be, for example, an online personal music library, and may include audio recordings, such as music tracks, uploaded by the user. The user may be able to access audio recordings stored in the user library 361 by, for example, logging in to the user's account for the online storage service that operates the storage server 100 from a computing device such as the computing device 200.

The matcher 110 may determine that the audio recording, for example, the music track version two 146 that the user is attempting to upload matches an audio recording with multiple versions, for the music track version one 144 and the music track version two 146, in the library 141. The matcher 110 may receive the appropriate difference set from the difference sets 150, and apply the difference set to the audio recording being uploaded by the user. For example, the matcher 110 may receive the difference set generated by the matcher 110 from the music track version one 144 and the music track version two 146.

The matcher 110 may use the difference set from the difference sets 150 to identify which version of the audio recording the user is attempting to upload to the storage server 100. The difference set may indicate, for example, that the music track version two 146 includes an edit at the 30 second mark that differentiates it from the music track version one 144. The matcher 110 may check the audio recording being uploaded by the user, for example, the copy of the music track version two 146, to determine if it contains the edit indicated by the difference set. If the copy of the music track version two 146 includes the edit, the matcher 110 may identify it as a copy of the music track version two 146 already in the library 141. The matcher 110 may then stop the upload from the computing device 200, and may instead place a link in the user library 361 to the music track version two 146 in the library 141. The music track version two link 365 may allow the user to access the appropriate version of the music track, the music track version two 146, from their user library 361, without requiring a copy of the music track version two 146 be stored in the storage 140 of the storage server 100, saving storage space. The music track version two 146 in the library 141 may also have more complete metadata and better audio quality than the copy of the music track version two 146 the user attempted to upload from the computing device 200.

Figure 4:
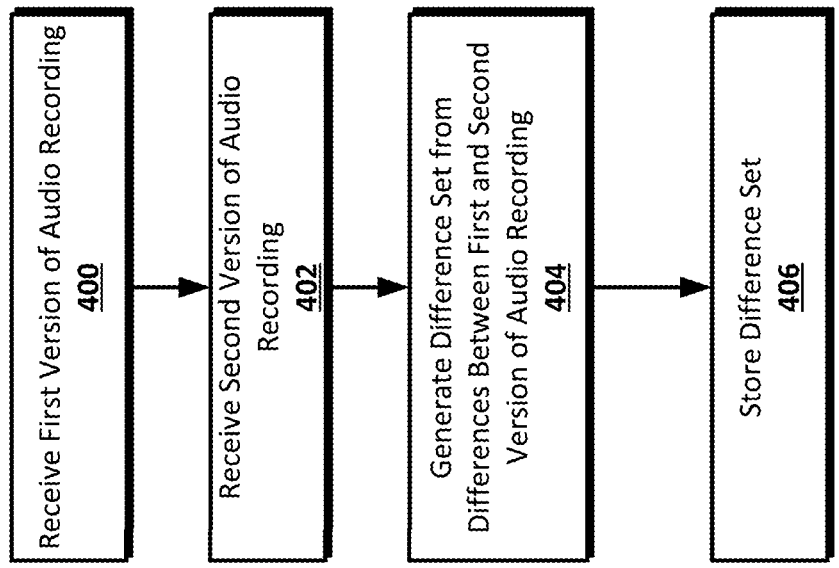
FIG. 4 shows an example of a process for finding differences in nearly-identical audio recordings according to an implementation of the disclosed subject matter.

FIG. 4 shows an example of a process for finding differences in nearly-identical audio recordings according to an implementation of the disclosed subject matter. At 400, a first version of an audio recording may be received. For example, the matcher 110 may receive the music track version one 144 from the library 141.

At 402, a second version of the audio recording may be received. For example, the matcher 110 may receive the music track version two 146 from the library 141. The first and second versions of the audio recording may be different versions of the same audio recording. For example, the first version may be the explicit version of a music track, and the second version may be the edited version of the music track.

At 404, a difference set may be generated from differences between the first and second versions of the audio recording. For example, the matcher 110 may use time domain and frequency domain analysis to determine differences, or edits, between the music track version one 144 and the music track version two 146. For example, the matcher 110 may determine time locations, duration, strength, and audio fingerprints for edits where profanity in an explicit music track was removed or bleeped out to create an edited version of the music track.

At 406, the difference set may be stored. For example, the difference set may be stored with the difference sets 150 in the storage 140. The difference set may be stored for future use by the matcher 110 in distinguishing different versions of the audio recording, for example, determining whether an uploaded music track is a copy of the music track version one 144 or the music track version two 146.

Figure 5:
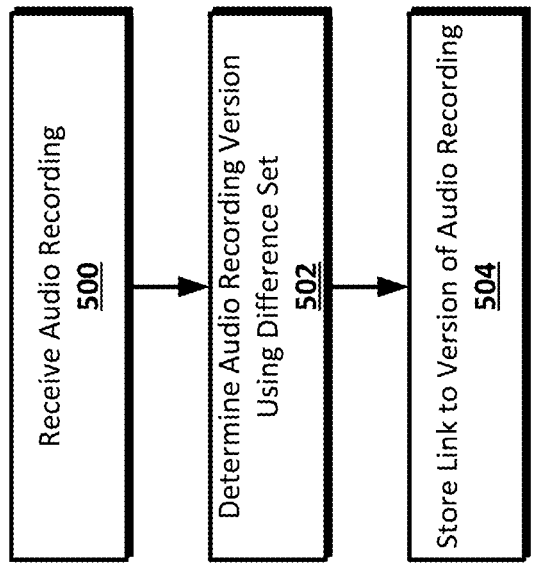
FIG. 5 shows an example of a process for finding differences in nearly-identical audio recordings according to an implementation of the disclosed subject matter.

FIG. 5 shows an example of a process for finding differences in nearly-identical audio recordings according to an implementation of the disclosed subject matter. At 500, an audio recording may be received. For example, the matcher 110 may receive an audio recording, such as the copy of the music track version two 146, from the computing device 200. The computing device 200 may be attempting to upload the copy of the music track version two 146 to the user library 365 on the storage server 100. The matcher 110 may not receive the entirety of the audio recording, as only a portion of the audio recording may be needed, and the matcher 110 may attempt to identify if the audio recording can be linked, for example, from the library 141, before the entirety of the audio recording is uploaded in order to save bandwidth for the user of the computing device 200.

At 502, a difference set may be used to determine the version of the audio recording. For example, the matcher 110 may identify the received audio recording as having different versions in the library 141. For example, the matcher 110 may determine that the copy of the music track version two 146 uploaded from the computing device 200 may be a version of the music track that has two versions, the music track version one 144 and the music track version two 146, in the library 141. The matcher 110 may receive the difference set from the difference sets 150, for example, generated by the matcher 110 by comparing the music track version one 144 and the music track version two 146 from the library 141. The difference set may be used to determine the version of the copy of the music track version two 146 being uploaded from the computing device 200. For example, the difference set may indicate that the music track version two 146 includes an edit at the 30 second mark. The matcher 110 may check the copy of the music track version two 146 to determine if the music track version two 146 includes the edit at its 30 second mark, for example, matching an audio fingerprint of the edit from the difference set to an audio fingerprint taken from the 30 second mark of the copy of the music track version two 146. If the audio fingerprints match, the copy of the music track version two 146 may be determined to match the music track version two 146, and not the music track version one 144.

At 504, a link to the proper version of the audio recording may be stored. For example, the matcher 110 may store a link to the proper version of the audio recording, as determined using one of the difference sets 150, in the user library 365. The link may point to the proper version of the audio recording that is stored in the library 141. For example, the matcher 110 may identify that the copy of the music track version two 146 that the computing device 200 attempted to upload matches the music track version two 146 in the library 141. The matcher 110 may place a link in the user library 365 to the music track version two 146 in the library 141.

Figure 6:
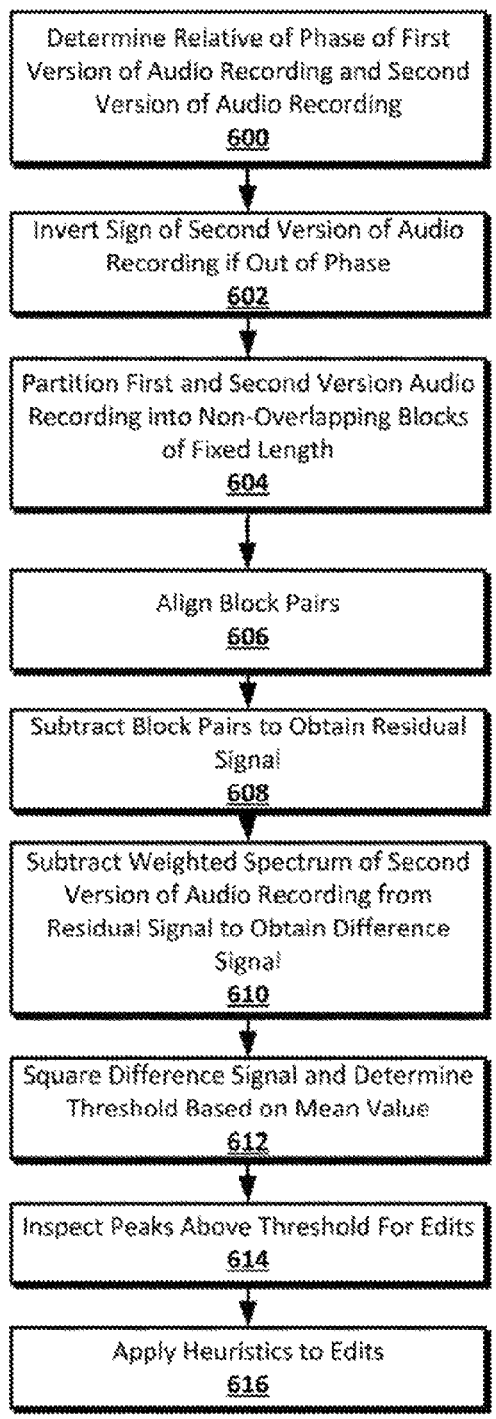
FIG. 6 shows an example of a process for finding differences in nearly-identical audio recordings according to an implementation of the disclosed subject matter.

FIG. 6 shows an example of process for finding differences in nearly-identical audio recordings according to an implementation of the disclosed subject matter. At 600, the relative phase of a first version of an audio recording and a second version of an audio recording may be determined. For example, the matcher 110 may receive the music track version one 144 and the music track version two 146 from the library 141. The matcher 110 may determine the relative phase between the audio signals in the music track version one 144 and the music track version two 146.

At 602, the sign of the second version of the audio recording may be inverted if the first version of the audio recording and the second version of the audio recording are out of phase. For example, if the matcher 110 determines that the music track version one 144 and the music track version two 146 are 180 degrees out of phase, the matcher 110 may reverse the sign of the audio signal in the music track version two 146.

At 604, the first and second version of the audio recording may be partitioned into non-overlapping blocks of fixed length. For example, the matcher 110 may partition the audio signals from the music track version one 144 and the music track version two 146 into two sets of non-overlapping blocks of fixed length. For example, if each of the music track version one 144 and the music track version two 146 is 3 minutes long, each set of non-overlapping blocks may include 36 blocks, each 5 second in length. Corresponding blocks from the sets of blocks for the first audio recording and the second audio recording may form block pairs. For example, the first block of the music track version one 144 and the first block of the music track version two 146 may form a block pair.

At 606, the block pairs may be aligned. For example, the block sets may not include blocks of the exact same length, as, for example, the first version of the audio recording may be longer than the second version of the audio recording. For example, that matcher 110 may divide the music track version one 144 into 36 blocks of 5.2 seconds, while the music track version two 146 may be divided into 36 blocks of 5 seconds. Each block pair may include one block that is 5.2 seconds and one block that is 5 seconds. To align the blocks, one of the blocks may be interpolated, for example, at 1/2, 1/3, and 2/3 sample positions, and various alignments may be considered to find the alignment that yields the smallest error.

At 608, the block pairs may be subtracted to obtain a residual signal. For example, in each block pair with one block from the first version of the audio recording and one block from the second version of the audio recording, the block for the second version of the audio recording may be subtracted from the block for the first version of the audio recording, resulting in a residual signal. For example, the matcher 110 may subtract each block from the music track version two 146 from its corresponding block form the music track version one 144, producing a residual signal for each block pair.

At 610, a weighted spectrum of the second version of the audio recording may be subtracted from the residual signal to obtain a difference signal. For example, the residual signal may still include information that was in both the first version of the audio recording and the second version of the audio recording due to, for example, lack of perfect alignment between the blocks in the block pairs. This may occur when samples are missing, or the first and second version of the audio recording use different encodings. A weight spectrum of the second version of the audio recording may be subtracted from the residual signal, resulting in a difference signal. For example, the matcher 110 may determine a weighted spectrum for the music track version two 146, and subtract the weighted spectrum from the residual signal determined by subtracting the blocks for the music track version two 146 from the block for the music track version one 144. This may result in a difference signal for the music track version one 144 and the music track version two 146. The difference signal may include difference from all of the block pairs.

At 612, the difference signal may be squared and a threshold may be determined based on a mean value for the squared difference signal. For example, the matcher 110 may square the difference signal for the music track version one 144 and the music track version two 146, resulting in a squared difference signal. The mean value of the squared difference signal may be determined. The mean value may be set as a threshold.

At 614, peaks in the difference signal about the threshold may be inspected for edits. For example, the matcher 110 may inspect any peaks in the difference signal for the music track version one 144 and the music track version two 146 to determine if the peaks may correspond to an edit that was made to the music track version one 144 to produce the music track version two 146. For example, a peak may appear in the difference signal at a time location where profanity in the music track version one 144 was removed to create the music track version two 146. Any peak in the squared difference signal for the first and second version of an audio recording above the threshold may indicate an edit made between the first version of the audio recording and the second version of the audio recording.

At 616, heuristics may be applied to the edits. For example, the matcher 110 may apply any suitable heuristics to edits detected by inspecting peaks in the squared difference signal for the music track version one 144 and the music track version two 146. The heuristics may include, for example, determining if an excessive number of edits were detected, which may indicate that the music track version one 144 and the music track version two 146 are not actually different versions of the same music track, but are instead entirely different music tracks. Any edits not discarded by the heuristics may be stored in a difference set, for example, with the difference sets 150, for the music track version one 144 and the music track version two 146.

Figure 7:
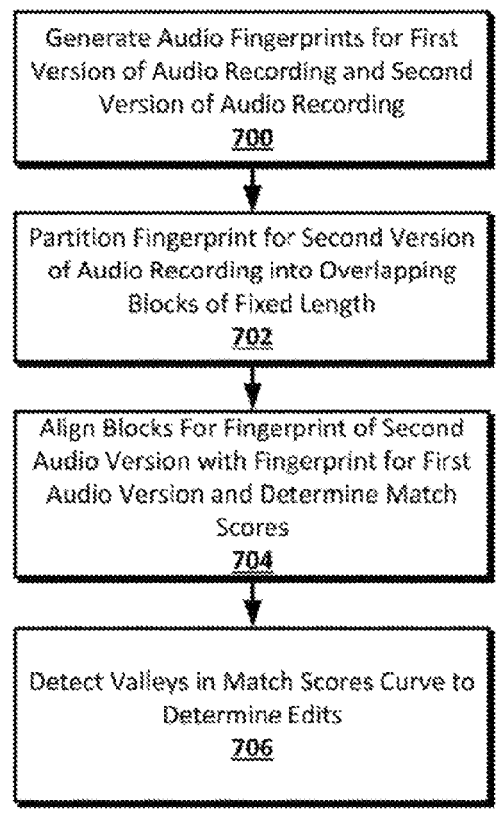
FIG. 7 shows an example of a process for finding differences in nearly-identical audio recording according to an implementation of the disclosed subject matter.

FIG. 7 shows an example of a process for finding differences in nearly-identical audio recording according to an implementation of the disclosed subject matter. At 700, fingerprints for the first version and second version of an audio recording may be generated. For example, the matcher 110 may receive the music track version one 144 and the music track version two 146 from the library 141. The matcher 110 may generate an audio fingerprint for the audio signals in the music track version one 144 and the music track version two 146.

At 702, the audio fingerprint for the second version of the audio recording may be portioned into overlapping blocks of fixed length. For example, the matcher 110 may partition the audio fingerprint for the music track version two 146 into overlapping blocks of fixed length. The blocks may be of any suitable length.

At 704, the blocks from the audio fingerprint for the second version of the audio recording may be aligned with the first version of the audio recording and match scores may be determined. For example, the matcher 110 may align the blocks for the audio fingerprint of the music track version two 146 with the audio fingerprint of the music track version one 144. The alignment may take into account the neighborhood from which the block originated, for example, attempting to line the first block of the audio fingerprint for the music track version two 146 in the vicinity of the beginning of the audio fingerprint for the music track version one 144. Various alignments of the blocks may be attempted to determine an alignment with the best overall match score between the audio fingerprint blocks for the music track version two 146 and the audio fingerprint of the music track version one 144. Match scores may be determined for each aligned block in any suitable manner, with blocks with better matching alignments having higher match scores.

At 706, valleys may be detected in the match scores. For example, the matcher 110 may examine the match scores for the aligned blocks to detect a valley in a match scores curve. A valley may indicate a match score for a block that is much lower than the match score for the preceding and subsequent blocks. This may be an indication that the section of the music track version two 146 from which the audio fingerprint in the block was generated differs from the corresponding section of the music track version one 144. This may be due to the presence of an edit that causes the music track version two 146 to differ from the music track version one 144. The edits indicated by the valleys in the match score may be stored in a difference set, such as, for example, one the difference sets 150.

Figure 8:
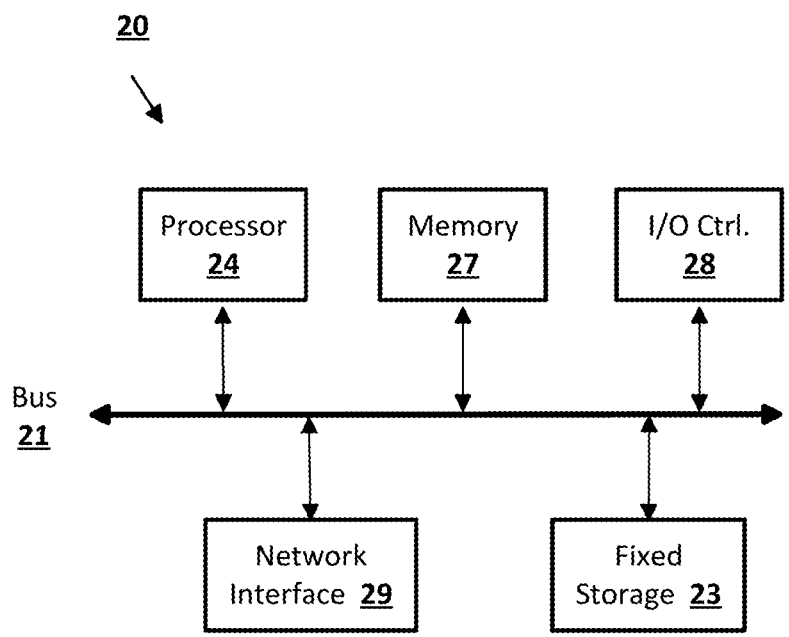
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
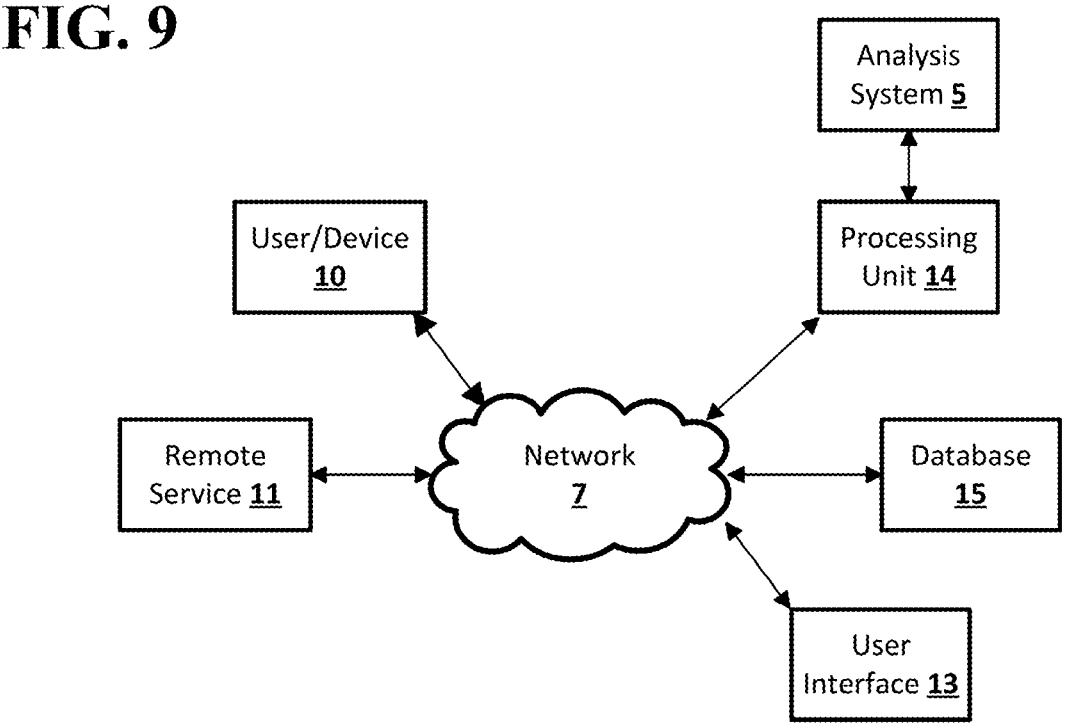
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
 receiving a first version of an audio recording;
 receiving a second version of the audio recording;
 determining at least one difference between the first version of the audio recording and the second version of the audio recording using one or more of time domain analysis and frequency domain analysis; and
 storing the at least one difference in a difference set, wherein the difference set allows the first version of the audio recording to be distinguished from the second version of the audio recording,
 wherein determining at the least one difference between the first version of the audio recording and the second version of the audio recording using time domain analysis comprises:
  partitioning the first version of the audio recording and the second version of the audio recording into non-overlapping blocks of fixed lengths,
  aligning the blocks for the second version of the audio recording with corresponding blocks for the first version of the audio recording to form block pairs,
  subtracting the block for the second version of the audio recording from the corresponding block for the first version of the audio recording for each block pair to obtain a residual signal,
  subtracting a weighted spectrum of the second version of the audio recording from the residual signal to obtain a difference signal,
  squaring the difference signal to obtain a squared difference signal,
  determining a mean value for the difference signal to obtain a threshold, and
  inspecting each peak in the squared difference signal that is greater than the threshold to determine if each peak represents one of the at least one differences.

2. The computer-implemented method of claim 1, wherein the at least one difference is an edit.

3. The computer-implemented method of claim 1, further comprising:
 receiving a copy of the audio recording, wherein the copy is either a copy of the first version of the audio recording or a copy of the second version of the audio recording;
 comparing the copy of the audio recording to the at least one difference from the difference set;
 determining that the copy of the audio recording does not include the at least one difference from the difference set; and
 identifying the copy of the audio recording as a copy of the first version of the audio recording.

4. The computer-implemented method of claim 1, further comprising:

receiving a copy of the audio recording, wherein the copy is either a copy of the first version of the audio recording or a copy of the second version of the audio recording;

comparing the copy of the audio recording to the at least one difference from the difference set;

determining that the copy of the audio recording includes the at least one difference from the difference set; and identifying the copy of the audio recording as a copy of the second version of the audio recording.

5. The computer-implemented method of claim 3, further comprising:

placing a link to the first version of the audio recording in a user library, wherein the first version of the audio recording is stored in an online music library distinct from the user library.

6. The computer-implemented method of claim 4, further comprising:

placing a link to the second version of the audio recording in a user library, wherein the second version of the audio recording is stored in an online music library distinct from the user library.

7. The computer-implemented method of claim 1, wherein the audio recording is a music track.

8. The computer-implemented method of claim 7, wherein the first version of the audio recording is an explicit version of the music track and wherein the second version of the audio recording is an edited version of the music track.

9. The computer-implemented method of claim 1, further comprising:

determining that the first version of the audio recording and the second version of the audio recording are 180 degrees out of phase; and inverting the sign of the second version of the audio recording before partitioning the second version of the audio recording.

10. The computer-implemented method of claim 1, wherein the first version of the audio recording and the second version of the audio recording are stored in an online music library.

11. The computer-implemented method of claim 3, wherein the copy of the audio recording is received from a computing device of a user with an account in an online storage service.

12. The computer-implemented method of claim 1, further comprising:

applying at least one heuristic to the at least one difference to determine if the at least one difference comprises an edit.

13. The computer-implemented method of claim 12, further comprising:

discarding all of the at least one difference based on applying a heuristic that determines that there are an excessive number of differences.

14. A computer-implemented system for finding differences in nearly identical audio recordings comprising:

a storage comprising a first version of an audio recording and a second version of the audio recording, and a difference set; and a matcher adapted to perform one or more of time domain analysis and frequency domain analysis on the first version of the audio recording and the second version of the audio recording to find at least one difference between the first version of the audio recording and the second version of the audio recording and to store the at least one difference in a difference set, wherein the matcher is configured to find the at least one difference between the first version of the audio recording and the second version of the audio recording using frequency domain analysis by:

generating an audio fingerprint for the first version of the audio recording and an audio fingerprint for the second version of the audio recording, partitioning the audio fingerprint for the second version of the audio recording into overlapping blocks of fixed length, aligning the blocks for the audio fingerprint for the second version of the audio recording with the audio fingerprint for the first version of the audio recording to obtain a best match score between the blocks and the audio fingerprint for the first version of the audio recording, and detecting valleys in a curve comprising match scores for each of the blocks, wherein each valley corresponds to one of the at least one differences.

15. The computer-implemented system of claim 14, wherein the matcher is further adapted to apply the difference set to a copy of the audio recording with an unknown version and determine whether the copy of the audio recording is a copy of the first version of the audio recording or a copy of the second version of the audio recording based on whether the copy of the audio recording with an unknown version matches at least one difference in the difference set.

16. The computer-implemented system of claim 15, wherein the storage further comprises an online music library, and wherein the first version of the audio recording and the second version of the audio recording are stored in the online music library.

17. The computer-implemented system of claim 16, wherein the storage further comprises a user music library distinct from the online music library.

18. The computer-implemented system of claim 17, wherein the matcher is further adapted to receive at least a portion of the copy of the audio recording with an unknown version from a remote computing device and place a link in the user library that links to the first version of the audio recording in the online music library or the second version of the audio recording in the online music library based on a determined version for the copy of the audio recording with an unknown version.

19. The computer-implemented system of claim 17, wherein the matcher is further adapted to receive the copy of the audio recording with an unknown version from the user library.

20. The computer-implemented system of claim 14, wherein the at least one difference comprises an edit made to the first version of the audio recording to generate the second version of the audio recording.

21. The computer-implemented system of claim 14, wherein the audio recording is a music track.

22. A system comprising: one or more computers and one or more storage devices storing instructions which are operable, when executed by the one or more computers, to cause the one or more computers to perform operations comprising:

receiving a first version of an audio recording;

receiving a second version of the audio recording;

determining at least one difference between the first version of the audio recording and the second version of the audio recording using one or more of time domain analysis and frequency domain analysis; and storing the at least one difference in a difference set, wherein the difference set allows the first version of the audio recording to be distinguished from the second version of the audio recording, wherein the instructions further cause the one or more computers to perform operations for determining at least one difference between the first version of the audio recording and the second version of the audio recording using time domain analysis further comprising:

partitioning the first version of the audio recording and the second version of the audio recording into non-overlapping blocks of fixed lengths;

aligning the blocks for the second version of the audio recording with corresponding blocks for the first version of the audio recording to form block pairs;

subtracting the block for the second version of the audio recording from the corresponding block for the first version of the audio recording for each block pair to obtain a residual signal;

subtracting a weighted spectrum of the second version of the audio recording from the residual signal to obtain a difference signal;

squaring the difference signal to obtain a squared difference signal;

determining a mean value for the difference signal to obtain a threshold;

inspecting each peak in the squared difference signal that is greater than the threshold to determine if each peak represents one of the at least one differences.

23. A system comprising: one or more computers and one or more storage devices storing instructions which are operable, when executed by the one or more computers, to cause the one or more computers to perform operations comprising:

receiving a first version of an audio recording;

receiving a second version of the audio recording;

determining at least one difference between the first version of the audio recording and the second version of the audio recording using one or more of time domain analysis and frequency domain analysis; and storing the at least one difference in a difference set, wherein the difference set allows the first version of the audio recording to be distinguished from the second version of the audio recording, wherein the instructions further cause the one or more computers to perform operations determining at least one difference between the first version of the audio recording and the second version of the audio recording using frequency domain analysis comprising:

generating an audio fingerprint for the first version of the audio recording and an audio fingerprint for the second version of the audio recording;

partitioning the audio fingerprint for the second version of the audio recording into overlapping blocks of fixed length;

aligning the blocks for the audio fingerprint for the second version of the audio recording with the audio fingerprint for the first version of the audio recording to obtain a best match score between the blocks and the audio fingerprint for the first version of the audio recording; and detecting valleys in a curve comprising match scores for each of the blocks, wherein each valley corresponds to one of the at least one differences.

* * * * *